US007193981B1

(12) United States Patent
Ahmed et al.

(10) Patent No.: US 7,193,981 B1
(45) Date of Patent: Mar. 20, 2007

(54) METHOD OF PROCESSING SOFT HANDOFF INFORMATION AT A BASE STATION

(75) Inventors: Walid Ahmed, Monmouth, NJ (US); Joe Huang, Morris, NJ (US); Sarath Kumar, Bangalore (IN); Sanjiv Nanda, Monmouth, NJ (US); Devesh T. Patel, Middlesex, NJ (US); Melanie M. Wang, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1080 days.

(21) Appl. No.: 09/624,765

(22) Filed: Jul. 25, 2000

(51) Int. Cl.
*H04Q 7/00* (2006.01)
(52) U.S. Cl. ...................... 370/331; 455/442
(58) Field of Classification Search .............. 370/331, 370/332; 455/436, 437, 438, 442
See application file for complete search history.

(56) References Cited

U.S. PATENT DOCUMENTS

| | | | | |
|---|---|---|---|---|
| 6,038,448 A | * | 3/2000 | Chheda et al. .............. 455/436 |
| 6,049,716 A | * | 4/2000 | Jung ........................... 455/442 |
| 6,055,428 A | * | 4/2000 | Soliman ...................... 455/437 |
| 6,151,502 A | * | 11/2000 | Padovani et al. ........... 455/442 |
| 6,192,246 B1 | * | 2/2001 | Satarasinghe ............... 455/442 |
| 6,360,100 B1 | * | 3/2002 | Grob et al. .................. 455/442 |
| 6,546,248 B1 | * | 4/2003 | Jou et al. ..................... 455/434 |

\* cited by examiner

*Primary Examiner*—Huy D. Vu
*Assistant Examiner*—Daniel J. Ryman

(57) ABSTRACT

In the method of processing soft handoff information at a base station, soft handoff information of a mobile station is received at the base station. The soft handoff information indicates at least a number of base stations in an active list of the mobile station. The active list is a list of base stations involved in a call of the mobile station. The base station applies a rules set to the soft handoff information to determine changes in the active list. The rules set requires more stringent conditions be met to add a base station to the active list when the active list includes a first number of base stations as compared to when the active list includes a second number of base stations; wherein the first number is greater than the second number. The determination results are then sent to the mobile station.

13 Claims, 1 Drawing Sheet

METHOD OF PROCESSING SOFT HANDOFF INFORMATION AT A BASE STATION

BACKGROUND OF THE INVENTION

1. Field of the Invention

The present invention relates to the field of wireless communication; and more particularly, a method of processing soft handoff information at a base station.

2. Description of Related Art

FIG. 1 illustrates three adjacent cells in a wireless communication system. The communication needs of mobile stations (MSs) in each cell 10 are served by a base station (BS) in the cell. Under certain conditions, such as when the mobile station MS is moving from one cell to another as depicted by the arrow in FIG. 1, the base station BS of the cell 10 containing the mobile station MS hands off communicating with the mobile station MS to another base station BS.

Code Division Multiple Access (CDMA) wireless communication systems involve processing at the mobile station in deciding whether to handoff responsibility for communicating with the mobile station from one base station to another base station. This has been generally referred to as soft handoff.

CDMA standards such as those governing wireless communication in the United States, IS-95A and IS-95B, specify soft handoff processing at the mobile station. The soft handoff processing at the mobile station involves making measurements and precatory determinations as to handoff, but the base station serving the communication needs of the mobile station makes the final decision on handoff. Furthermore, the methodology employed by the base station is not specified in the standards. As a result, a demand exists for base station soft handoff processing methodologies that reduce the percentage of time the mobile station is in handoff without degrading system performance (e.g., reducing system capacity or costing more network resources).

SUMMARY OF THE INVENTION

In the method of soft handoff processing at a base station according to the present invention, as the number of base stations participating in a call increases, the conditions for another base station to participate in the call become more stringent. This helps prevent base stations from falling in and out of participation in the call.

Specifically, when deciding whether a candidate base station should participate in the call, the base station with primary responsibility for handling the communication needs of the mobile station applies a set of rules that require more stringent conditions be met to add a base station to the active list of base stations involved in the call when the active list includes a first number of base stations as compared to when the active list includes a second number of base stations, the first number being greater than the second number.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
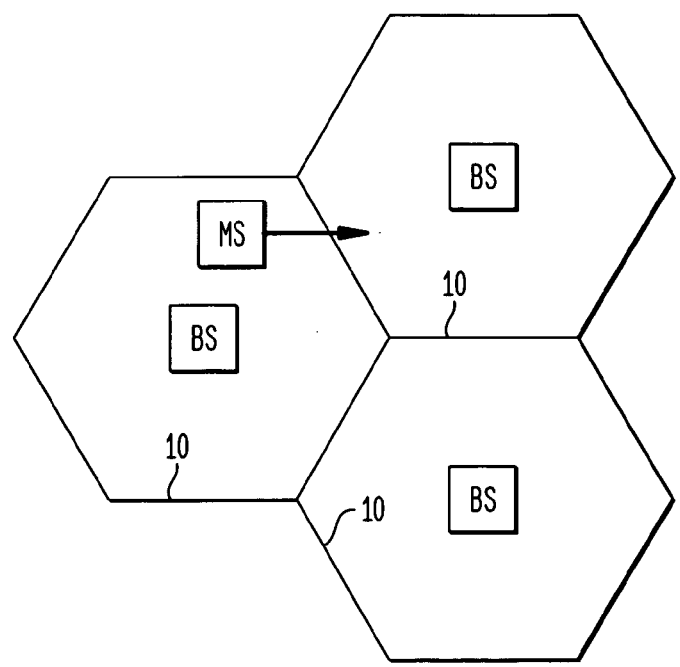
FIG. 1 illustrates three adjacent cells in a wireless communication system.

For purposes of explanation only, the method of processing soft handoff information at a base station according to the present invention will be described with respect the IS-95A and IS-95B CDMA standards, but it will be readily appreciated how to employ the methodology of the present invention in other CDMA standards.

Before describing the method of processing soft handoff information at a base station according to the present invention, aspects of the IS-95A and IS-95B standards for supporting soft handoff will be described.

IS-95A

In order to support soft handoff functionality in IS-95A, CDMA mobile stations implement a system for managing the pilot signals or pilots transmitted by base stations. The main features of the mobile station's approach to this management are:

- The pilots detectable by the mobile station are partitioned into four similar, mutually exclusive sets known as the Active Set, the Candidate Set, the Neighbor Set and the Remaining Set.
- Membership in a given pilot set is based on a pilot's stature as a potential soft handoff participant.
- Membership in the pilot sets is constantly updated, based on information from the local RF environment.
- Pilots move into or out of each pilot set based on four handoff parameters, known as T_ADD, T_DROP, T_COMP, and T_TDROP.

The term pilot as used in the art with respect to the pilot sets is interchangeable with the term base station. Stated another way, a pilot in a particular set means the base station with that pilot is in the pilot set.

Pilot Sets

The pilot sets are:

Active Set

The set of pilots currently participating in the call. In other words, these pilots are actually being demodulated and combined by the mobile station.

Candidate Set

These are pilots that are not currently participating in the call, but have been received with sufficient strength to be successfully demodulated by the mobile. These pilots can be thought of as being "on deck" for inclusion in the active set.

Neighbor Set

These are pilots that are not in the Active or Candidate Sets, but are likely candidates for handoff. This set of pilots is "under close scrutiny" by the mobile.

Remaining Set

This is the set of all possible pilots in the current CDMA system on the current carrier frequency assignment that are not in one of the other sites.

Handoff Parameters

The handoff parameters are:

T_ADD and T_COMP

T_ADD is a pilot detection threshold, and T_COMP is a differential threshold. If a pilot is in the Neighbor or Remaining Sets, and is detected above T_ADD, it is moved to the Candidate Set. The mobile station performs this move automatically, without intervention from the base station. Movements of pilots into the Active Set are also influenced by T_ADD and T_COMP, and the exact conditions required for movement depend on the state of the Active Set according to base station's processing methodology as will be discussed later. Accordingly, the definition of T_ADD and T_COMP will become clearer based on the description of the base station processing methodology given below.

T_DROP and T_TDROP

T_DROP and T_TDROP together control the removal of a pilot from the Active Set. The basic mechanism is: If a pilot's strength is below T_DROP for T_TDROP seconds, then remove it from the Active Set. Further, T_DROP also controls the demotion of a pilot out of the Candidate Set. If a pilot is in the Candidate Set when its T_TDROP timer expires, it will be demoted to the Neighbor Set.

Although T_DROP and T_TDROP are related, their purposes are slightly different. T_DROP provides general control over how reluctant the Active Set is to release pilots. T_TDROP, on the other hand, is primarily a mechanism to prevent premature dropping of pilots in a fading environment.

MS-BS Messaging Exchange

Next the messaging exchange between the mobile station and the base station according to IS-95A will be described. The mobile station will generate and send a Pilot Strength Measurement Message (PSMM) to the base station when one of the following conditions is satisfied:

1. The signal strength or strength of a pilot in the Neighbor Set exceeds T_ADD, and accordingly, the mobile station moves the pilot to the Candidate Set.

2. The strength of a pilot in the Candidate Set exceeds the strength of a pilot in the Active Set by T_COMP.

3. The strength of a pilot in the Active Set drops below T_DROP, a drop timer is started (equal to T_TDROP) for the pilot, and the drop timer expires.

4. The pilot satisfies conditions 2 or 3 above after a handoff direction message (discussed below) is received from the base station.

Each PSMM includes the pilots (i.e., base stations) and the strength for the pilots in the Active Set (thus indicating the number of base stations in the active set) and each pilot in the Candidate Set having a strength that exceeds T_ADD.

If, based on the PSMM, the base station decides to add or drop a base station from the Active Set, the base station sends a handoff direction message indicating the decision to the mobile station. The mobile station then follows the directed action and sends a handoff completion message to the base station.

IS-95B

In IS-95A, all pilots above T_ADD are reported by the mobile station to the base station. Hence, the system, generally, allows the mobile station to have every pilot with strength greater than T_ADD in the Active Set. In IS-95B, the mobile station reports pilots that are strong enough to be "worth" reporting and adding. In order to do so, the mobile station measures the strength of a candidate pilot against a dynamic ADD threshold that is a function of the total energy of the active pilots. Similarly, IS-95A allows all pilots above T_DROP to remain in the Active Set. On the other hand, IS-95B only allows pilots that are strong enough to remain in the Active Set. To do so, the mobile station measures the strength of a candidate pilot against a dynamic DROP threshold that is a function of the total energy of the active pilots.

Figure 2:
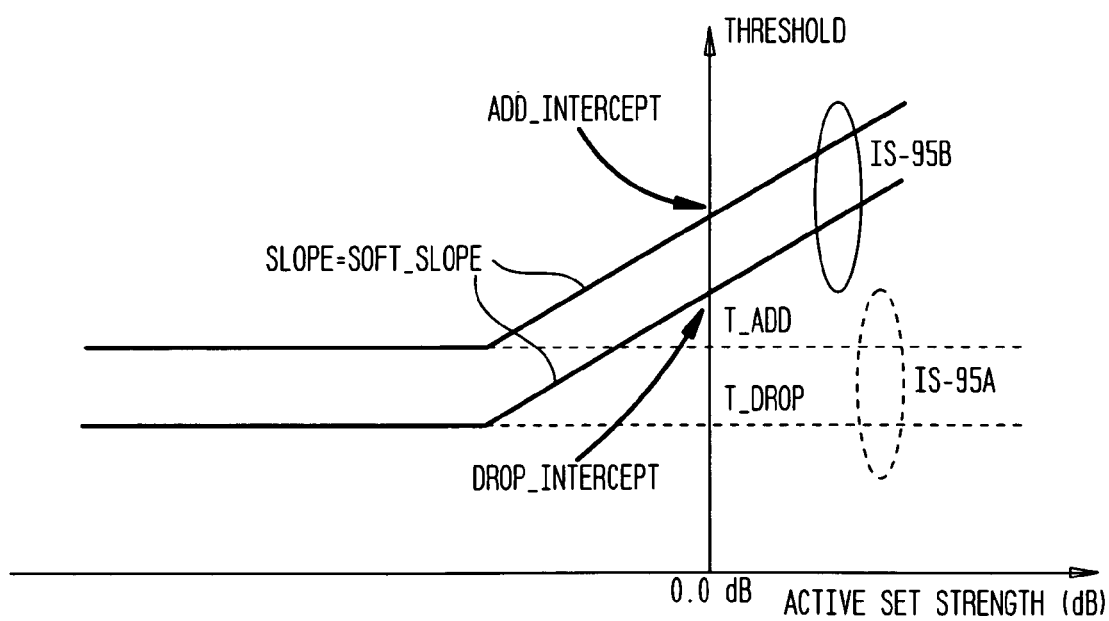
FIG. 2 graphically illustrates the ADD_INTERCEPT, DROP_INTERCEPT and SOFT_SLOPE parameters and shows a comparison between the ADD and DROP thresholds for IS-95A and B.

As alluded to above, additional parameters are defined for IS-95B, namely, ADD_INTERCEPT, DROP_INTERCEPT, and SOFT_SLOPE. The aforementioned parameters contribute to the calculation of the dynamic ADD and DROP thresholds (DAT and DDT, respectively) as follows:

$$DAT_j(\text{dB}) = \max\left(\left(\text{SOFT\_SLOPE} * 10 * \log\left(\sum_{i:P_i \in A} PS_i\right) + \text{ADD\_INTERCEPT}\right), \text{T\_ADD}\right) \quad (1)$$

$$DDT_j(\text{dB}) = \max\left(\left(\text{SOFT\_SLOPE} * 10 * \log\left(\sum_{\substack{i:P_i \in A \\ PS_i \geq PS_j}} PS_i\right) + \text{DROP\_INTERCEPT}\right), \text{T\_DROP}\right) \quad (2)$$

where $PS_i$ is the strength of the $i^{th}$ pilot in the Active Set, and A denotes the Active Set. In equation (2), $PS_j$ is the strength of the pilot in question, i.e., the pilot to be dropped. FIG. 2 graphically illustrates the ADD_INTERCEPT, DROP_INTERCEPT and SOFT_SLOPE parameters and shows a comparison between the ADD and DROP thresholds for IS-95A and B. Notice that the definitions of the Active Set strength for the DROP case is slightly different from that for the ADD case. For the DROP case, the Active Set strength is the sum of only Active Set pilots that are stronger than the pilot examined. It should also be mentioned that it has been required for IS-95B that DROP_INTERCEPT be 2.0 dB below ADD_INTERCEPT.

MS-BS Messaging Exchange

Next the messaging exchange between the mobile station and the base station according to IS-95B will be described. The mobile station will generate and send a Pilot Strength Measurement Message (PSMM) to the base station when one of the following conditions is satisfied:

1. The strength of a pilot in the Candidate Set exceeds DAT.

2. The strength of a pilot in the Candidate Set exceeds the strength of a pilot in the Active Set by T_COMP and exceeds DAT.

3. The strength of a pilot in the Neighbor Set exceeds the maximum of DAT and T_ADD.

4. The strength of a pilot in the Active Set drops below T_DROP, a drop timer is started (equal to T_DROP) for the pilot, and the drop timer expires.

Each PSMM includes the pilots (i.e., base stations) and the strength for the pilots in the Active Set (thus indicating the number of base stations in the Active Set), each pilot in the Candidate Set having a strength greater than T_ADD, and each pilot in the Candidate Set having a strength greater than DAT.

If, based on the PSMM, the base station decides to add or drop a base station from the Active Set, the base station sends a handoff direction message indicating the decision to the mobile station. The mobile station then follows the directed action and sends a handoff completion message to the base station.

BS Processing

Next, the soft handoff processing performed at the base station according to the present invention will be described. When a PSMM is received, the base station decides to have the mobile station add a candidate base station to the Active Set based on the following add conditions:

Add Conditions

1. If the Active Set is of size one, i.e., the call is in simplex, add the candidate pilot if its strength exceeds T_DROP.

2. If the Active Set is of size two, i.e., the call is in duplex, add the candidate pilot if it satisfies one of the following three conditions:
   (i) The candidate pilot strength exceeds DAT (IS-95B)/T_ADD (IS-95A)
   (ii) The candidate pilot strength is T_COMP higher than the weakest pilot in the Active Set and above T_DROP.
   (iii) The candidate pilot strength is larger than that for the strongest pilot in the Active Set and above T_DROP.

3. If the Active Set size is more than two, i.e., triplex or higher (but not full), add the candidate pilot if one of the following conditions is satisfied:
   (i) The candidate pilot strength is T_COMP above the weakest pilot in the Active Set and also exceeds DAT (IS-95B)/T_ADD (IS-95A).
   (ii) The candidate pilot strength is larger than that for the strongest pilot in the Active Set and above T_DROP.

4. If the Active Set is full, a candidate pilot is swapped according to the following swap conditions:
   (i) The candidate pilot strength is T_COMP above the weakest pilot in the Active Set, it exceeds DAT (IS-95B/T_ADD (IS-95A).
   (ii) The candidate pilot strength is larger than that for the strongest pilot in the Active Set and above T_DROP.

With respect to condition 4, the candidate pilot is swapped with the weakest pilot in the Active Set.

As seen from the above add conditions, the processing is less aggressive in adding for Active Set sizes greater than one. Also, the more active legs a call has, the less aggressive in adding.

It will also be appreciated from the forgoing that T_ADD and DAT are greater than T_DROP.

When the PSMM is received, the base station also decides whether to drop an Active Set base station if the PSMM indicates that the drop timer for the Active Set base station has expired.

Then, the base station generates and sends a handoff direction message to the mobile station that indicates the add and drop decisions made by the base station.

The invention being thus described, it will be obvious that the same may be varied in many ways. Such variations are not to be regarded as a departure from the spirit and scope of the invention, and all such modifications are intended to be included within the scope of the following claims.

The invention claimed is:

1. A method of processing soft handoff information at a base station, comprising:
   receiving, at the base station, soft handoff information of a mobile station, the soft handoff information indicating at least a number of base stations in an active list of the mobile station, the active list being a list of base stations involved in a call of the mobile station;
   applying a rules set to the soft handoff information to determine changes in the active list, the rules set requiring more stringent conditions be met to add a base station to the active list when the active list includes a first number of base stations as compared to when the active list includes a second number of base stations, the first number being greater than the second number; and
   sending determination results to the mobile station; and
   wherein the applying step
      applies the rules set to base stations in a potentials list, the potentials list being a list of base stations which are potential base stations for the active list, and
      swaps a potential base station from the potentials list with a base station in the active list if the active list is full and the potential base station has a signal strength a threshold greater than a signal strength of the base station in the active list.

2. The method of claim 1, wherein the potentials list is the candidate list in IS-95 standards.

3. The method of claim 1, wherein the applying step moves a potential base station from the potentials list to the active list when the active list contains one base station and the potential base station has a signal strength greater than a first threshold.

4. The method of claim 3, wherein the applying step moves a potential base station from the potentials list to the active list when the active list contains two or more base stations and the potential base station has a signal strength greater than a second threshold, the second threshold being greater than the first threshold.

5. The method of claim 4, wherein the applying step moves a potential base station from the potentials list to the active list when the active list contains three or more base stations, the potential base station has a signal strength greater than the second threshold, and the signal strength of the potential base station is a third threshold greater than a signal strength of a base station in the active list.

6. The method of claim 4, wherein the signal strength of at least one of the base station in the active list is the weakest signal strength of base stations in the active list.

7. The method of claim 3, wherein the applying step moves a potential base station from the potentials list to the active list when the active list contains two base stations, the potential base station has a signal strength greater than the first threshold, and the signal strength of the potential base station is a second threshold greater than a signal strength of a base station in the active list.

8. The method of claim 7, wherein the signal strength of at least one of the base station in the active list is the weakest signal strength of base stations in the active list.

9. The method of claim 3, wherein the applying step moves a potential base station from the potentials list to the active list when the active list contains two or more base stations, the potential base station has a signal strength greater than the first threshold, and the signal strength of the potential base station is greater than a signal strength of a base station in the active list.

10. The method of claim 9, wherein the signal strength of at least one of the base station in the active list is the strongest signal strength of base stations in the active list.

11. The method of claim 1, wherein the first number is two or more, and the second number is 1.

12. The method of claim 1, wherein the first number is three or more, and the second number is 1.

13. A method of processing soft handoff information at a base station, comprising:
   receiving, at the base station, soft handoff information of a mobile station, the soft handoff information indicating at least a number of base stations in an active list of the mobile station, the active list being a list of base stations involved in a call of the mobile station;
   applying a rules set to the soft handoff information to determine changes in the active list, the rules set requiring more stringent conditions be met to add a base station to the active list when the active list includes a first number of base stations as compared to when the active list includes a second number of base stations, the first number being greater than the second number; and
   sending determination results to the mobile station,
   wherein the applying step moves a potential base station from the potentials list to the active list when the active list contains three or more base stations and the potential base station has a signal strength a threshold greater than a signal strength of a base station in the active list.

* * * * *